US009047276B2

(12) United States Patent
Little

(10) Patent No.: US 9,047,276 B2
(45) Date of Patent: Jun. 2, 2015

(54) AUTOMATIC TRANSLATION OF SYSTEM MESSAGES USING AN EXISTING RESOURCE BUNDLE

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 283 days.

(21) Appl. No.: 13/675,612

(22) Filed: Nov. 13, 2012

(65) Prior Publication Data

US 2014/0136180 A1    May 15, 2014

(51) Int. Cl.
G06F 17/28    (2006.01)
G06F 9/44     (2006.01)

(52) U.S. Cl.
CPC ............ *G06F 17/289* (2013.01); *G06F 9/4448* (2013.01)

(58) Field of Classification Search
CPC ............ G06F 17/2809; G06F 17/2854; G06F 17/289; G06F 9/4448
USPC .......................................................... 704/2, 8
See application file for complete search history.

(56) References Cited

U.S. PATENT DOCUMENTS

| | | | | |
|---|---|---|---|---|
| 6,490,547 B1 * | 12/2002 | Atkin et al. | ......................... | 704/8 |
| 6,865,716 B1 * | 3/2005 | Thurston | ....................... | 715/207 |
| 7,278,100 B1 * | 10/2007 | Ehrman | ......................... | 715/264 |
| 7,313,587 B1 * | 12/2007 | Dharmarajan | ................. | 709/201 |
| 7,447,624 B2 * | 11/2008 | Fuhrmann | ........................... | 704/8 |
| 8,260,604 B2 * | 9/2012 | Harrenstien et al. | ............... | 704/3 |
| 8,438,007 B1 * | 5/2013 | Hokari et al. | ...................... | 704/8 |
| 8,489,385 B2 * | 7/2013 | Etzioni et al. | ...................... | 704/2 |
| 2002/0198699 A1 * | 12/2002 | Greene et al. | ...................... | 704/2 |
| 2003/0093262 A1 * | 5/2003 | Sanchez Gomez | ............... | 704/4 |
| 2004/0122652 A1 * | 6/2004 | Andrews et al. | ................... | 704/2 |
| 2007/0136470 A1 * | 6/2007 | Chikkareddy et al. | ......... | 709/226 |
| 2008/0077391 A1 * | 3/2008 | Chino et al. | ...................... | 704/7 |
| 2008/0120089 A1 * | 5/2008 | Schurig | .............................. | 704/2 |
| 2008/0127045 A1 * | 5/2008 | Pratt et al. | ...................... | 717/104 |
| 2008/0262827 A1 * | 10/2008 | DeGroot | ........................... | 704/3 |
| 2009/0276206 A1 * | 11/2009 | Fitzpatrick et al. | ............... | 704/2 |
| 2009/0299726 A1 * | 12/2009 | Canu et al. | ......................... | 704/3 |
| 2011/0074574 A1 * | 3/2011 | Becker et al. | ................. | 340/540 |

(Continued)

OTHER PUBLICATIONS

Max, Aurélien, Josep Maria Crego, and Franøois Yvon. "Contrastive Lexical Evaluation of Machine Translation." LREC. May 2010., pp. 1753-1757.*

(Continued)

*Primary Examiner* — James Wozniak
(74) *Attorney, Agent, or Firm* — Lowenstein Sandler LLP

(57) ABSTRACT

A processing device receives a message identifier associated with an application. and identifies a first language that an operating system running on the processing device is configured to use. Responsive to determining that a first application resource bundle associated with the application and configured for the first language is not available, the processing device selects a second application resource bundle that is associated with the application and configured for a second language, identifies a first version of a message associated with the message identifier in the second application resource bundle, sends the first version of the message to an automated translator with a request to translate the first version of the message to the first language, and receives a first translated version of the message that is in the first language. The processing device may then present or store the first translated version of the message.

19 Claims, 6 Drawing Sheets

(56) References Cited

U.S. PATENT DOCUMENTS

| | | | |
|---|---|---|---|
| 2012/0022851 A1* | 1/2012 | Bremner et al. | 704/3 |
| 2012/0116751 A1* | 5/2012 | Bernardini et al. | 704/3 |
| 2012/0303354 A1* | 11/2012 | Schurig | 704/2 |

OTHER PUBLICATIONS

Bangalore, Srinivas, German Bordel, and Giuseppe Riccardi. "Computing consensus translation from multiple machine translation systems." Automatic Speech Recognition and Understanding, 2001. ASRU'01. IEEE Workshop on. IEEE, 2001, pp. 351-354.*

Och, Franz Josef, and Hermann Ney. "Statistical multi-source translation."Proc. of Machine Translation Summit VIII. 2001, pp. 1-6.*

Matusov, Evgeny, Nicola Ueffing, and Hermann Ney. "Computing Consensus Translation for Multiple Machine Translation Systems Using Enhanced Hypothesis Alignment." EACL. 2006, pp. 1-8.*

Schroeder, et al. "Word lattices for multi-source translation." Proceedings of the 12th Conference of the European Chapter of the Association for Computational Linguistics. Association for Computational Linguistics, Apr. 2009, pp. 719-727.*

* cited by examiner

AUTOMATIC TRANSLATION OF SYSTEM MESSAGES USING AN EXISTING RESOURCE BUNDLE

TECHNICAL FIELD

Embodiments of the present invention relate to internationalization and localization of software, and more specifically to automatically generating localization data after an application has been deployed.

BACKGROUND

Software is typically developed in a language of a developer with interfaces tailored to a region of the developer. For example, much software is developed in English for use in North America. In order to expand a user base for the software, the software may be translated into foreign languages and otherwise modified for use in other regions.

Internationalization and localization are a means of adapting software to different regions, and includes adapting for different languages, for regional differences and for different technical requirements of a target market. Internationalization (also known as i18n) refers to the process of designing the software so that it can be readily adapted to different languages and regions without reprogramming the software. Internationalized software is designed for use in a range of locales by allowing the co-existence of multiple languages and character sets for input, display and a user interface. Localization (also known as L10n) refers to the process of adapting software that has already been internationalized for a specific region or language by adding locale specific components and/or translating text. Localized software has been configured for use in a particular locale.

Typically, providing a localization package for a particular language or region includes hiring specialized technical writers to construct a culturally appropriate syntax for potentially complicated concepts, as well as using engineering resources to deploy and test localization components. The cost of localizing software for a particular region can be quite high. Thus, it may not be economically viable to localize software for relatively small language populations. Moreover, it can be difficult to maintain parallel versions of texts throughout the life of an application or other software. For example, if a message that will be displayed to a user is modified, all of the translated versions of that message should be modified as well. This lengthens the development cycle and increases development costs.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for localizing software for a particular language using automated translators. Developers may generate localization packages for an application or other software, which are referred to herein as a resource bundles. Each resource bundle is tailored for a specific locale and contains a collection of messages in a specific language appropriate for that locale. However, the developers may not generate resource bundles for every locale.

In one embodiment, an application running on a processing device determines to print a message to a display (e.g., generates a print to screen or print message command). The processing device receives a message identifier from the application along with the print message command. The processing device identifies a current locale in which the processing device is running, and determines that there are no resource bundles for the current locale associated with the application. The processing device selects a resource bundle for a different locale, and identifies a message in the selected resource bundle associated with the message identifier. The processing device then sends the message to an automated translator, receives a translated version of the message from the automated translator, and then displays the translated version of the message. Therefore, a user of the application can understand the message that is displayed.

Embodiments of the present invention mitigate the cost of localizing software for specific locales and languages. So long as at least one resource bundle exists for an application, messages in that resource bundle can be translated "on-the-fly" when translated versions of the messages are to be used. For example, translated versions of a message may be generated responsive to a fault indicating that a resource bundle for a current locale is not available. Thus, software developers may forgo generating resource bundles for less populated locales and still be able to provide software to those locales.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
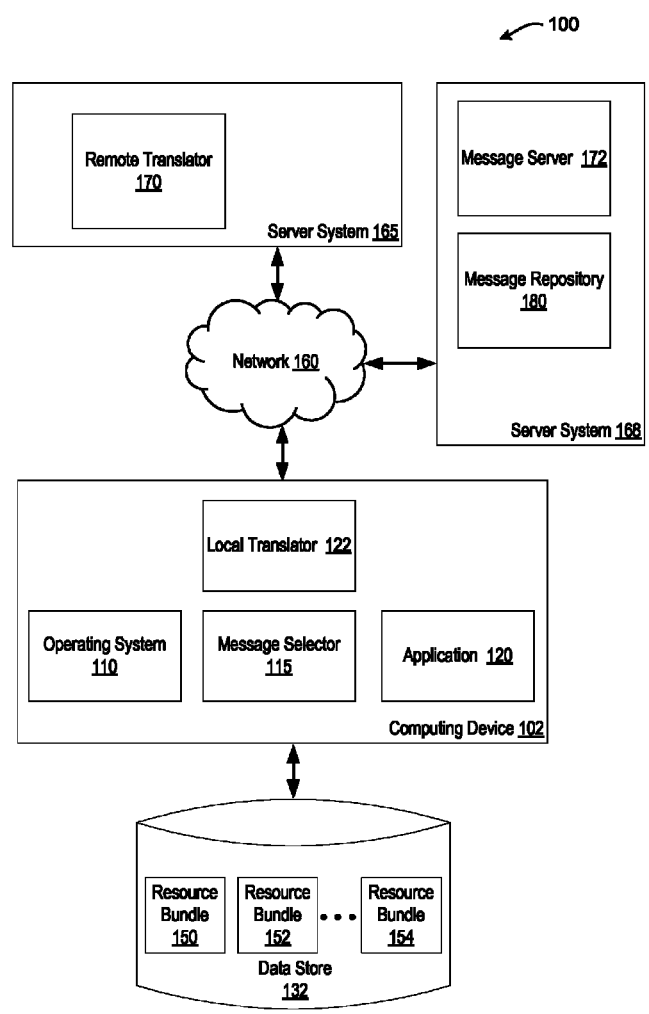
FIG. 1 is a block diagram that illustrates an example network architecture, in which embodiments of the present invention may operate.

FIG. 1 is a block diagram that illustrates an example network architecture 100, in which embodiments of the present invention may operate. The network architecture 100 may include a computing device 102 coupled to one or more server systems 165, 168 via a network 120. The network 120 may be a private network (e.g., a local area network (LAN), wide area network (WAN), intranet, etc.), a public network (e.g., the Internet), or a combination thereof.

The computing device 102 may be a rackmount server, a workstation, a desktop computer, a notebook computer, a tablet computer, a mobile phone, a palm-sized computing device, a personal digital assistant (PDA), etc. Computing device 102 includes hardware, which includes one or more processing devices, peripheral devices, memory, and other hardware components. The computing device 102 may be a single machine or multiple machines arranged in a cluster.

Computing device 102 may be coupled to a data store 132. The data store 132 may be an data store including one or more internal storage devices or an external data store including one or more external storage devices. Examples of storage devices include hard disk drives, optical drives, tape drives, solid state drives, and so forth. An external data store may be directly connected to the computing device 102 (e.g., via a universal serial bus (USB) cable), or may be accessible over a local area network (LAN), a wide area network (WAN) and/or a public network such as the internet.

Computing device 102 includes an operating system 110, a message selector 115 and an application 120. The message selector 115 and application 120 may be separate modules (as shown). Alternatively, message selector 115 may be a component of application 120. In one embodiment, computing device 102 additionally includes a local translator 122. Additionally, or in the alternative, computing device may be networked to a server system 165 hosting a remote translator 170 via network 160.

The operating system 110 may be, for example, a Windows® operating system, an OS X® operating system, a Linux operating system, an iOS® operating system, an Android® operating system, or other operating system. The operating system 110 may be configured for a specific locale. When the application 120 runs on the computing device 102, the operating system 110 may identify the specific locale to the application 120. This may notify the application 120 of a language that should be used for a user interface, for displayed messages, for menu items, and so forth. In one embodiment, the locale is identified using International Organization for Standardization (ISO) 639 two letter or three letter codes. For example, the ISO 639-1 code for English is en, for Spanish is es, for Chinese is zh, and so forth.

During execution, the application 120 may identify data that is to be presented to a user. The identified data may be identified by a message identifier. For example, the application 120 may encounter a fault, and that fault may be associated with message identifier 155. The application 120 may generate a print to screen or print message command that includes the identified message identifier. Application 120 may provide the message identifier to message selector 115.

Message selector 115 is configured to select messages for output. In one embodiment, message selector 115 is a logging framework. The logging framework may include a logger that logs a message, a formatter that formats the message and a handler that performs an operation using the formatted message. Message selector 115 may select a specific message to present to a user. In one embodiment, message selector determines a locale that operating system 110 is configured for. Message selector then searches for a resource bundle 150-154 that is associated with that locale. If an appropriate resource bundle is not found, message selector 115 may select an alternative resource bundle that is associated with a different locale (e.g., a locale other than the locale that the operating system 110 is configured for). In one embodiment, a particular resource bundle (e.g., an American English resource bundle) is designated as a default resource bundle. Message selector 115 may select the default resource bundle or a different resource bundle.

Once a resource bundle is selected, message selector 115 finds an entry in the resource bundle that includes the received message identifier. Message selector 115 then transmits the message to an automated translator for translation into a language appropriate for the locale that operating system 110 is configured for. Message selector 115 may send the message to a local translator 122 and/or to a remote translator 170. The local translator 122 may be able to perform message translation more quickly than remote translator 170, but may have a smaller number of languages that it supports.

In one embodiment, message selector 122 first sends a translation request to local translator 122. The translation request may include an indication of a language that the message is being translated from and/or a language that the message is to be translated to. If local translator 122 can perform the translation, then it may translate the message and provide a translated version of the message to message selector 115. Otherwise, local translator 122 may return a fault. Responsive to receiving a fault from the local translator 122, message selector 115 may send a translation query including the message to remote translator 170, and may receive a translated version of the message in response. Responsive to receiving a translated version of the message, message selector 115 may provide the translated version to application 120, which may print the message to a screen. Alternatively, message selector 115 may print the translated version of the message to a screen.

Note that in addition to displaying the translated version of the message (or providing the translated version of the message to application 120 for display), message selector 115 may store the translated version of the message and/or perform other operations on the translated version of the message. Therefore, if message selector 115 is later asked to provide the message for the specific locale, it may return the stored translated version of the message without generating a new translation request.

In some embodiments, message selector 115 may proactively select messages to be translated and store translations of those messages. This may be performed in the background while the application is running. In one embodiment, processing logic may receive a message identifier for a message selected to be translated by message selector 115 responsive to a determination that available resources exceed a threshold. Therefore, if message selector 115 is ever requested to display a particular message in a language of a particular locale, message selector 115 may have a translated version of the message already prepared. Message selector 115 may build up a new resource bundle for an application and a specific locale, and store the new resource bundle in data store 132.

Server systems 165 and 168 may each include one or more machines (e.g., one or more server computers, routers, gateways, etc.) that have processing and storage capabilities to provide server-based functionality. The server systems 165, 168 may each be implemented by a single machine or a cluster of machines, each of which may include data stores and/or other data processing equipment. In one embodiment, the server systems 165, 168 include one or more network based servers, which may be hosted, for example, by network based hosting services such as Amazon's® Elastic Compute Cloud® (EC2).

The server system 165 includes a remote translator 170, which may provide network-accessible server-based translation functionality. Remote translator 170 may be a network accessible translator that provides, for example, a representational state transfer (REST) based application programming interface (API). For example, remote translator 170 may be an online translation service accessible via the Internet.

Server system 168 includes a message server 172 that also provides network-accessible server-based functionality. In one embodiment, message selector 115 transmits translated messages to message server 172. Message server 172 may receive translated messages from multiple different computing devices and store those translated messages in message repository 180. Each received translated message may indicate a locale that it was translated into, a message identifier, and an application that the message is for. The message server 172 may generate a new resource bundle for the locale and application using the received translated messages. Message server 172 may initially create an empty resource bundle, and may populate the generated resource bundle with the received translated messages. Message server 172 may respond to queries from message selectors 115 for specific translated versions of messages and/or may provide an entire resource bundle having a collection of translated messages to message selectors 115.

In one embodiment, before requesting a translation of a message, message selector 115 queries the message repository 180 for the translated version of the message. If the same message was previously translated for another instance of the application running on a different computing device, then message repository 180 may have the translated version of the message available. The message repository 180 may also have an entire or partial resource bundle for the current locale and application. If the translated version of the message (or a resource bundle including the translated version of the message) is available in the message repository 180, then message server 172 may provide the translated version to message selector 115, and message selector 115 may forgo requesting that the message be translated.

Figure 2:
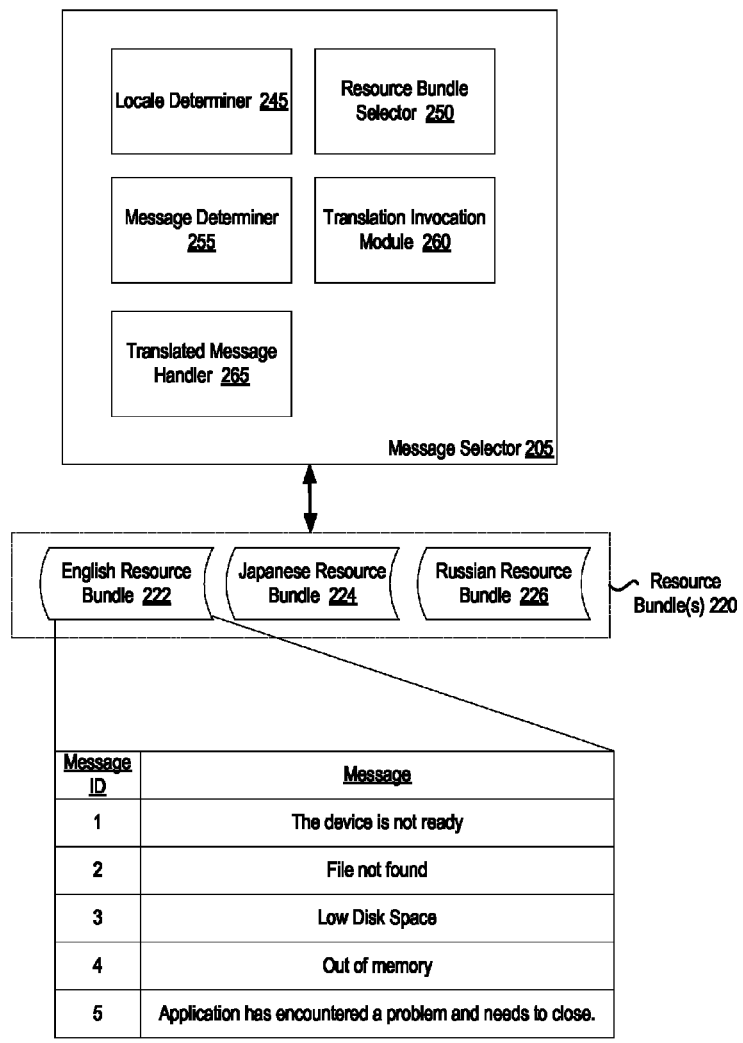
FIG. 2 is a block diagram of a message selector, in accordance with one embodiment of present invention.

FIG. 2 is a block diagram of a message selector 205, in accordance with one embodiment of present invention. In one embodiment, message selector 205 corresponds to message selector 115 of FIG. 1. In one embodiment, message selector 205 includes a locale determiner 245, a resource bundle selector 250, a message determiner 255, a translation invocation module 260 and a translated message handler 265. Alternatively, the functionality of one or more of the locale determiner 245, resource bundle selector 250, message determiner 255, translation invocation module 260 and translated message handler 265 may be subdivided into multiple modules or may be combined into a single module.

Message selector 205 may receive a command to perform an action associated with a particular message identifier of an application or may otherwise identify a message identifier and an action to perform. In one embodiment, the command is a print to screen command indicating that a message associated with an identified message identifier should be printed to a screen. In another embodiment, the command may be a command to store a message associated with a message identifier. Message selector 205 may also independently determine that a message associated with a message identifier should be preemptively translated and stored, or that it should be printed (e.g., to a screen, to a log, to a printer, etc.).

Locale determiner 245 determines a locale that a local operating system is configured to use. The operating system may provide the locale information to all applications, so that those applications will present data in a language associated with that locale. Locale determiner 245 may report the locale information to resource bundle selector 250.

Resource bundle selector 250 determines whether there are any resource bundles 220 for a particular application that are associated with the determined locale. For example, an application may have an English resource bundle 222 for an English locale, a Japanese resource bundle 224 for a Japanese locale and a Russian resource bundle 226 for a Russian locale. However, the application may not have additional resource bundles for Spanish, German, Swedish, and so on.

If a resource bundle for the determined locale is identified, resource bundle selector 250 selects that resource bundle. However, if no resource bundle for the current locale is available, a fault may be generated. Responsive to the fault, resource bundle selector 250 may select an alternative resource bundle for an alternative locale. For example, resource bundle selector 250 may select English resource bundle 222 if a resource bundle for a current locale is not available. In one embodiment, a particular resource bundle is identified as a default resource bundle, and this resource bundle is selected. The default resource bundle may be for an original locale that the application was written for.

Message determiner 255 identifies a message in the selected resource bundle that is associated with the received or identified message identifier. The resource bundle may include a series of entries, where each entry includes an associated message identifier and a message in a particular language. For example, in the illustrated example English resource bundle 222 includes message ID 1, which is associated with the message, "The device is not ready," as well as other message IDs associated with other messages.

In one embodiment, a single resource bundle includes multiple different types of messages. For example, a single resource bundle may include error messages, warning messages, debug messages, text for a graphical user interface (GUI), log statements, text for a console, and so forth. Alternatively, there may be multiple resource bundles associated with a particular locale and application. Each of these multiple resource bundles may include different types of messages (e.g., one resource bundle may include error messages, while another resource bundle may include text for a GUI). In one embodiment, resource bundles have a size that ranges from about 10 kb to about 100 kb.

Translation invocation module 260 generates a translation query for one or more automated translators. Translation invocation module 260 may be configured with information identifying addresses of one or more local translators and/or remote translators from which to request translations. For a local translator, the information may include sufficient information to launch an instance of the local translator. Once the local translator is running, translation invocation module may send a translation query to an address space of the local translator. For a remote translator, translation invocation module 260 may include an internet protocol (IP) address of the translator and/or a uniform resource locator (URL) for the translator. Examples of remote translators that may be queried include the automated translator at translate.google.com or the automated translator at babblefish.com.

Translation requests may include the message to be translated, an indication of a language that the message is in, and an indication of a language to translate the message to. Alternatively, some translators may automatically detect a language that the message is in. In such a case, the translation request may include the message and an indication of the language to translate the message to.

In one embodiment, translation invocation module 260 prioritizes translators. For example, translation invocation module 260 may include an ordered list of translators, and may query translators based on their order in the list. Translators at a top of the order may be queried first, and translators lower in the order may be queried subsequently.

Translated message handler 265 performs one or more operations using the translated version of the message. If message selector 205 received the message identifier in a print to screen command, then translated message handler 265 may display the translated version of the message. If message selector 205 initiated the translation request unilaterally, then translated message handler 265 may store the translated version of the message for later use. Translated message handler 265 may also store the translated version of the message if the message identifier was received in a print to screen command. Some examples of operations that translated message handler 265 may perform include displaying the message on a console, writing the message to a file or syslog, adding the message to a database table, distributing the message, sending the message via an email, writing the message to a socket, and so forth.

In one embodiment, translated message handler 265 transmits the translated version of the message to a remote message server. Alternatively, or additionally, translated message handler 265 may create a new resource bundle for the current locale, and add the translated version of the message to the newly created resource bundle. If an incomplete resource bundle for the current locale already exists, then translated message handler 265 may add the translated version of the message to the incomplete resource bundle for the current locale.

In one embodiment, resource bundle selector 250 selects multiple (e.g., two) resource bundles if a resource bundle for a current locale is not located. Message determiner 255 may then identify a message associated with the received message identifier in each resource bundle. Subsequently, translation invocation module 260 may request translations of each of the identified versions of the message. Translated message handler 265 may then compare the message translations. If the two (or more) translated versions of the message vary by less than a threshold, this may indicate that the translations are accurate. However, if the messages vary by more than the threshold, this may indicate that one or both of the messages are poor translations. The threshold may be a specific word or character difference between the translated versions of the message (e.g., 2 different words, 8 different characters, etc.). Alternatively, or in addition, the threshold may be a percentage of the total words or characters in the message (e.g., 10% of the words and/or characters in the message). If the messages vary by at least the threshold, then each of the messages may be stored or displayed by translated message handler 265. If at least three translated versions are generated, then the translated versions that are closest to one another may be identified as being more accurate, and the other translated versions may be discarded.

Alternatively, or additionally, translated message handler 265 may include a rules engine that applies one or more heuristics to select a superior translated version of the message. The heuristics may be language specific. For example, the heuristics may include a grammar checker similar to the grammar checker used in word processing programs. If one translated version of the message is determined to have superior grammar, then this translated version may be selected, and the other translated version (or versions) may be discarded.

Figure 3:
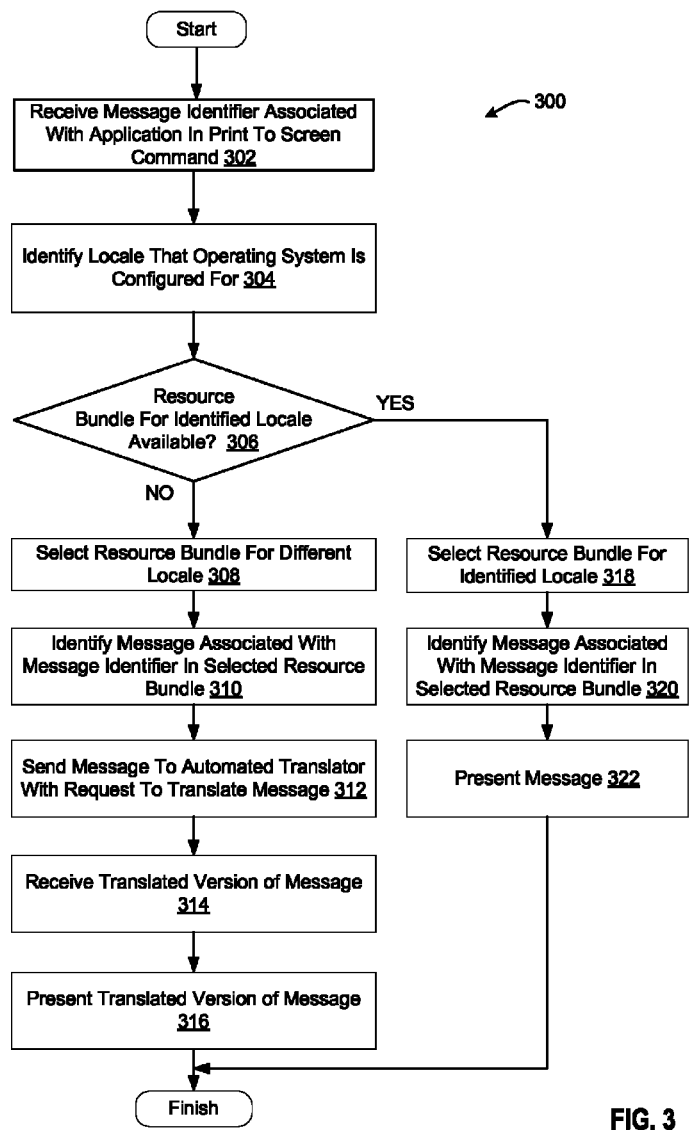
FIG. 3 is a flow diagram illustrating one embodiment of a method for translating messages in a resource bundle during operation of an application.

FIG. 3 is a flow diagram illustrating one embodiment of a method 300 for translating messages in a resource bundle during operation of an application. The method 300 may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the method 300 are performed by the message selector 205 of FIG. 2.

At block 302 of method 300, processing logic receives a message identifier associated with an application in a print to screen command. The application may be running on an operating system that has been configured for a specific locale. At block 304, processing logic identifies the locale that the operating system is configured for. This may be performed by querying the operating system or by checking a locale configuration setting of the operating system.

At block 306, processing logic determines whether there is an available resource bundle for the application that is associated with the identified locale. If such a resource bundle is identified, the method proceeds to block 318. Otherwise, the method continues to block 308.

At block 318, processing logic selects the resource bundle for the identified locale. At block 320, processing logic identifies a message in the resource bundle associated with the received message identifier. At block 322, processing logic then presents the message or performs another operation on the message.

At block 308, processing logic selects a resource bundle that is for a different locale than the identified locale. At block 310, processing logic identifies the message associated with the received message identifier in the resource bundle. At block 312, processing logic sends the message to an automated translator along with a request to translate the message. The request may include an indication of a language to translate the message to and may or may not include an indication of a language the message is to be translated from.

At block 314, processing logic receives a translated version of the message from the automated translator. At block 316, processing logic presents the translated version of the message and/or performs another operation on the message. The method then ends.

Figure 4:
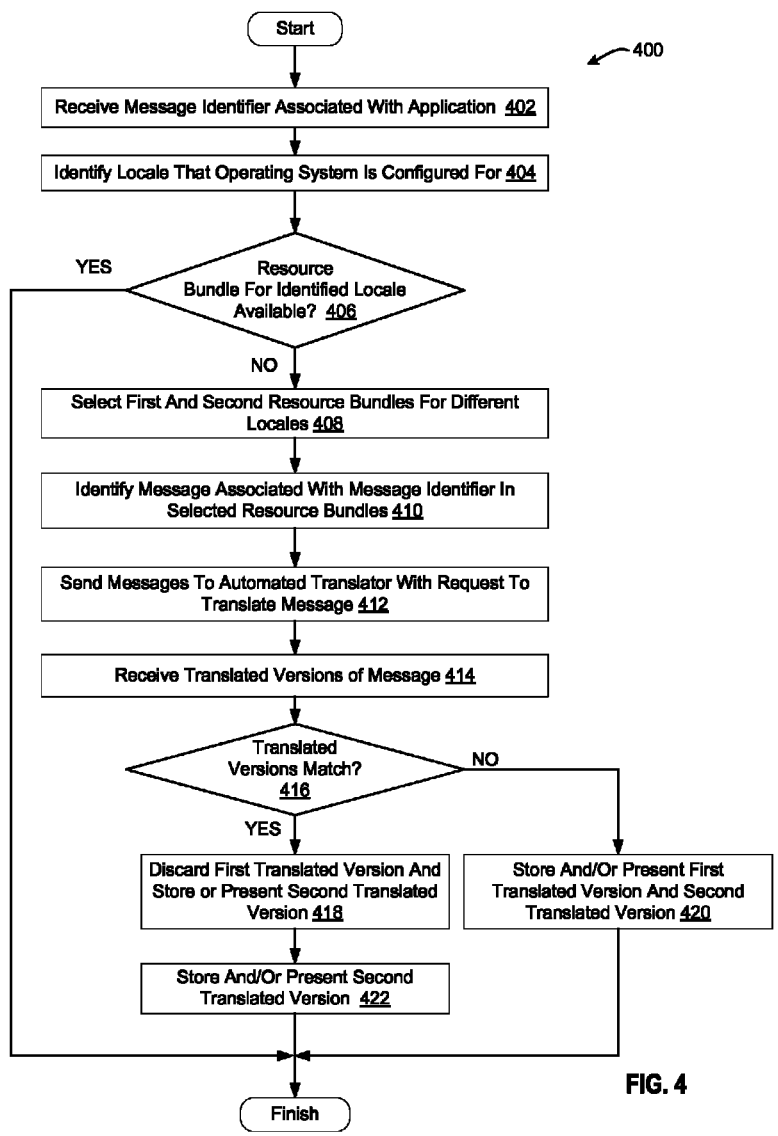
FIG. 4 is a flow diagram illustrating one embodiment of a method for translating messages in a resource bundle.

FIG. 4 is a flow diagram illustrating one embodiment of a method 400 for translating messages in a resource bundle. The method 400 may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 are performed by the message selector 205 of FIG. 2.

At block 402 of method 400, processing logic receives a message identifier associated with an application. The application may be running on an operating system that has been configured for a specific locale. At block 404, processing logic identifies the locale that the operating system is configured for. This may be performed by querying the operating system or by checking a locale configuration setting of the operating system.

At block 406, processing logic determines whether there is an available resource bundle for the application that is associated with the identified locale. If such a resource bundle is identified, the method ends. Otherwise, the method continues to block 408.

At block 408, processing logic selects a first resource bundle that is for a first locale that is different than the identified locale and a second resource bundle that is for a second locale that is different than the identified locale. At block 410, processing logic identifies a first version of the message associated with the received message identifier in the first resource bundle and a second version of the message in the second resource bundle. At block 412, processing logic sends the first and second versions of the message to an automated translator along with a request to translate the versions of the message.

At block 414, processing logic receives a first translated version of the message and a second translated version of the message from the automated translator. At block 416, processing logic determines whether the first and second translated versions of the message match. In one embodiment, the two translated versions of the message are determined to match if they vary by less than a threshold amount. If the two translated versions of the message are determined to match, the method continues to block 418. If the two translated versions of the message are determined not to match, processing logic continues to block 420.

At block 418, processing logic discards one of the translated versions of the message (e.g., the first translated version of the message). At block 422, processing logic then stores and/or presents the translated version of the message. In contrast, at block 420, processing logic stores and/or presents both the first and second translated versions of the message.

Figure 5:
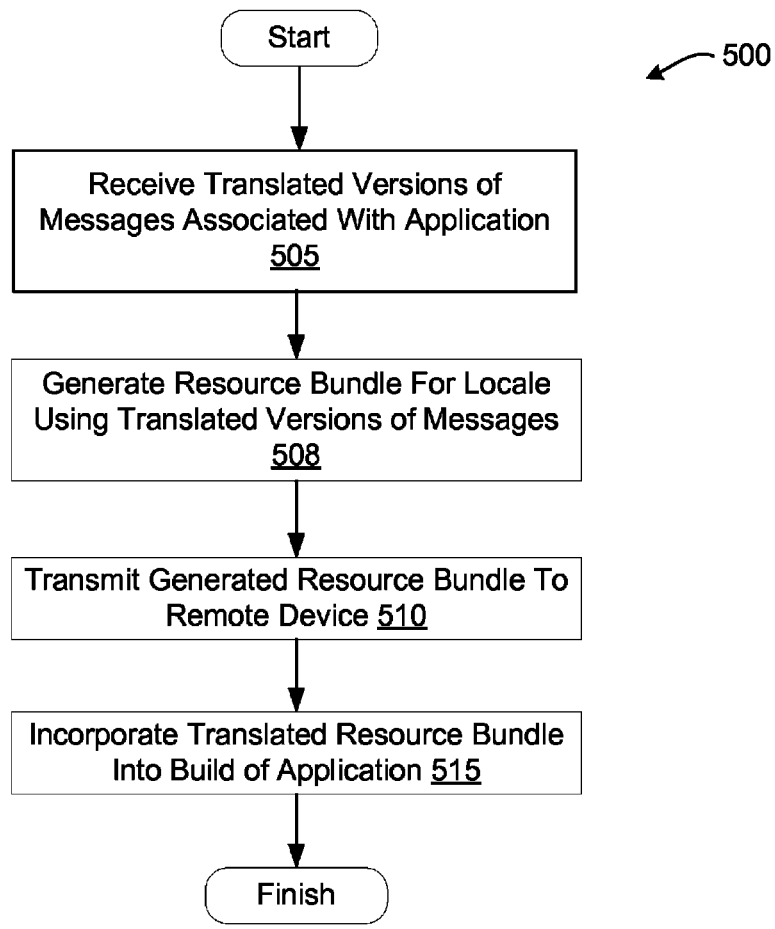
FIG. 5 is a flow diagram illustrating one embodiment of a method for generating resource bundles from machine translated messages.

FIG. 5 is a flow diagram illustrating one embodiment of a method 500 for generating resource bundles from machine translated messages. The method 500 may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the method 500 are performed by the message selector 205 of FIG. 2. In another embodiment, at least some of the operations are performed by message server 172 of FIG. 1.

At block 505 of method 500, processing logic receives one or more translated versions of messages associated with an application. The translated versions may be translated into a language or locale for which a resource bundle does not exist. At block 508, processing logic generates a resource bundle for the locale associated with the language into which the messages have been translated. Processing logic may then populate the resource bundle with the translated messages. Each of the received translated messages may include a message identifier. Each entry in the resource bundle may include a message identifier and the associated translated message. In one embodiment, the messages are ordered in alphanumeric order based on the associated message identifiers.

At block 510, processing logic transmits the generated resource bundle to a remote device. The generated resource bundle may be a complete resource bundle having translated versions of every message for the application. Alternatively, the generated resource bundle may be an incomplete resource bundle.

At block 515, processing logic may incorporate the translated resource bundle into a build of the application. Therefore, subsequent distributions and deployments of the application may include the newly generated resource bundle.

Figure 6:
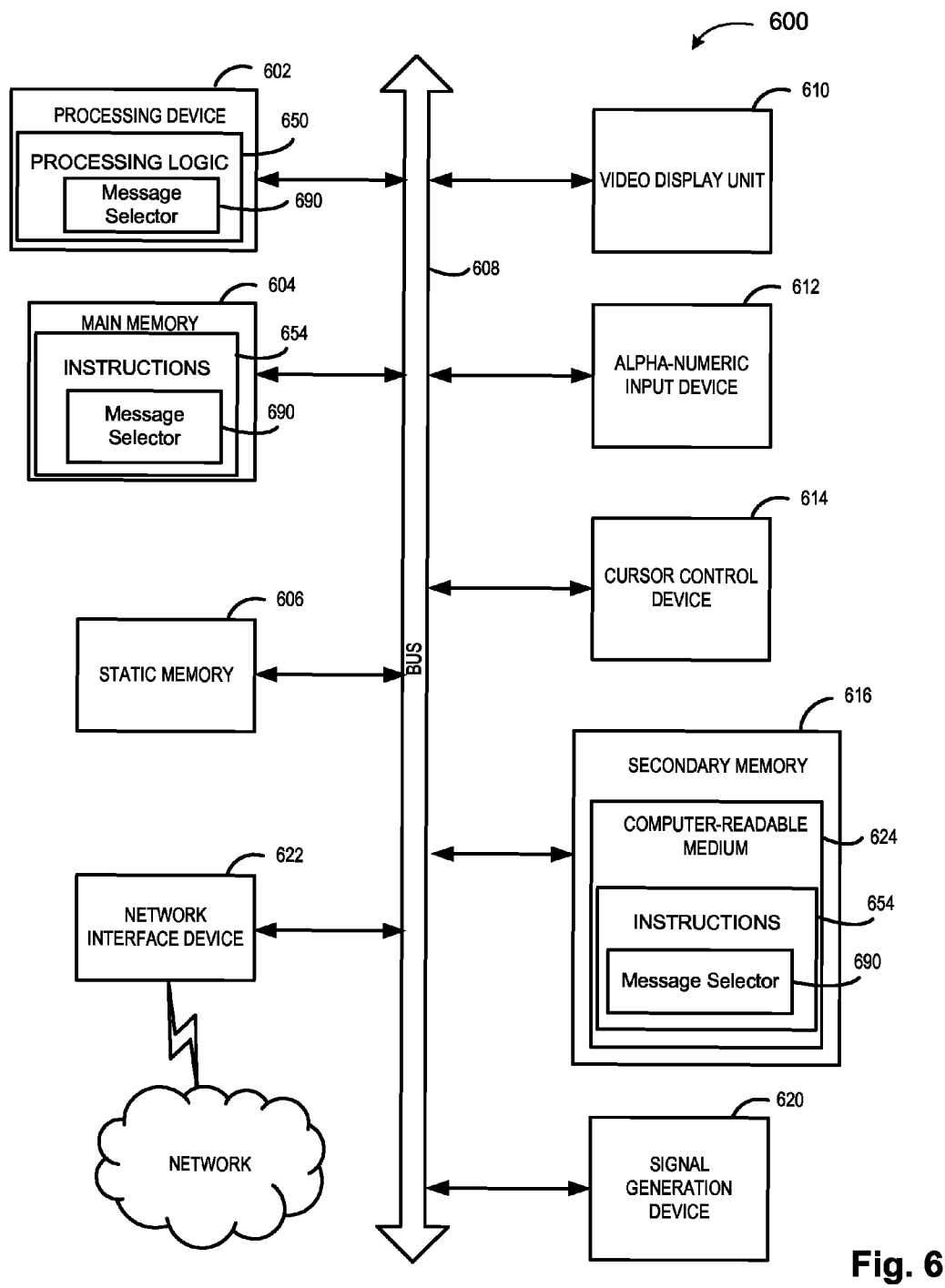
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to computing device 102 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., message selector 690, which may correspond to message selector 205 of FIG. 2). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions presented above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "sending", "selecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the intended purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read only memories (EPROMs), electronically erasable programmable read only memories (EEPROMs), magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the discussed method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    identifying, by a processing device, a message identifier associated with an application;
    identifying, by the processing device, a first language that an operating system running on the processing device is configured to use; and
    responsive to determining that a first application resource bundle associated with the application and configured for the first language is not available, performing the following:
        selecting a second application resource bundle that is associated with the application and configured for a second language;
        identifying a first version of a message associated with the message identifier in the second application resource bundle, the first version of the message being in the second language;
        sending the first version of the message to an automated translator with a request to translate the first version of the message to the first language;
        receiving a first translated version of the message that is in the first language;
        selecting a third application resource bundle that is associated with the application and configured for a third language;
        identifying a second version of the message associated with the message identifier in the third application resource bundle;
        sending the second version of the message to the automated translator with a request to translate the second version of the message to the first language;
        receiving a second translated version of the message that is in the identified language;
        comparing the first translated version of the message to the second translated version of the message;
        discarding the second translated version of the message responsive to determining that the first translated version of the message varies from the second translated version of the message by less than a threshold value; and
        performing at least one of storing or presenting both the first translated version of the message and the second translated version of the message responsive to determining that the first translated version of the message varies from the second translated version of the message by at least the threshold value.

2. The method of claim 1, wherein the automated translator is a translation service provided by a remote server.

3. The method of claim 1, wherein identifying the message identifier comprises receiving the message identifier in a print to screen command generated by the application responsive to an occurrence of a fault, the method further comprising:
    presenting the first translated version of the message.

4. The method of claim 1, wherein the second application resource bundle and the third application resource bundle each comprise at least one of error messages, debug messages or warning messages.

5. The method of claim 1, further comprising:
    transmitting the first translated version of the message to a remote server, wherein the remote server generates the first application resource bundle using the first translated version of the message.

6. The method of claim 1, further comprising:
    after sending the first version of the message to the automated translator with the request to translate the first version of the message to the first language, sending the first version of the message to an additional automated translator with the request to translate the first version of the message to the first language.

7. The method of claim 1, wherein identifying the message identifier comprises proactively selecting the message identifier while the application is running.

8. A non-transitory computer readable storage medium having instructions that, when executed by a processing device, cause the processing device to:
   identify, by the processing device, a message identifier associated with an application;
   identify, by the processing device, a first language that an operating system running on the processing device is configured to use; and
   responsive to determining that a first application resource bundle associated with the application and configured for the first language is not available, perform the following:
      select a second application resource bundle that is associated with the application and configured for a second language;
      identify a first version of a message associated with the message identifier in the second application resource bundle, the first version of the message being in the second language;
      send the first version of the message to an automated translator with a request to translate the first version of the message to the first language; and
      receive a first translated version of the message that is in the first language,
      select a third application resource bundle that is associated with the application and configured for a third language;
      identify a second version of the message associated with the message identifier in the third application resource bundle;
      send the second version of the message to the automated translator with a request to translate the second version of the message to the first language;
      receive a second translated version of the message that is in the identified language;
      compare the first translated version of the message to the second translated version of the message;
      discard the second translated version of the message responsive to determining that the first translated version of the message varies from the second translated version of the message by less than a threshold value; and
      perform at least one of storing or presenting both the first translated version of the message and the second translated version of the message responsive to determining that the first translated version of the message varies from the second translated version of the message by at least the threshold value.

9. The non-transitory computer readable storage medium of claim 8, wherein the automated translator is a translation service provided by a remote server.

10. The non-transitory computer readable storage medium of claim 8, wherein the message identifier is received in a print to screen command generated by the application responsive to an occurrence of a fault, and wherein the instructions further cause the processing device to:
   present the first translated version of the message.

11. The non-transitory computer readable storage medium of claim 8, wherein the second application resource bundle and the third application resource bundle each comprise at least one of error messages, debug messages or warning messages.

12. The non-transitory computer readable storage medium of claim 8, wherein the instructions further cause the processing device to:
   transmit the first translated version of the message to a remote server, wherein the remote server generates the first application resource bundle using the first translated version of the message.

13. The non-transitory computer readable storage medium of claim 8, wherein the instructions further cause the processing device to send the first version of the message to an additional automated translator with the request to translate the first version of the message to the first language after sending the first version of the message to the automated translator with the request to translate the first version of the message to the first language.

14. The non-transitory computer readable storage medium of claim 8, wherein identifying the message identifier comprises proactively selecting the message identifier while the application is running.

15. A computing device comprising:
   a memory comprising instructions, and
   a processing device coupled to the memory, wherein the instructions, when executed by the processing device, cause the processing device to:
   identify a message identifier associated with an application;
   identify a first language that an operating system running on the processing device is configured to use; and
   responsive to determining that a first application resource bundle associated with the application and configured for the first language is not available, perform the following:
      select a second application resource bundle that is associated with the application and configured for a second language;
      identify a first version of a message associated with the message identifier in the second application resource bundle, the first version of the message being in the second language;
      send the first version of the message to an automated translator with a request to translate the first version of the message to the first language; and
      receive a first translated version of the message that is in the first language,
      select a third application resource bundle that is associated with the application and configured for a third language;
      identify a second version of the message associated with the message identifier in the third application resource bundle;
      send the second version of the message to the automated translator with a request to translate the second version of the message to the first language;
      receive a second translated version of the message that is in the identified language;
      compare the first translated version of the message to the second translated version of the message;
      discard the second translated version of the message responsive to determining that the first translated version of the message varies from the second translated version of the message by less than a threshold value; and
      perform at least one of storing or presenting both the first translated version of the message and the second translated version of the message responsive to determining that the first translated version of the message varies from the second translated version of the message by at least the threshold value.

16. The computing device of claim 15, wherein the automated translator is a translation service provided by a remote server.

17. The computing device of claim 15, wherein the message identifier is received in a print to screen command generated by the application responsive to an occurrence of a fault, and wherein the instructions further cause the processing device to present the first translated version of the message.

18. The computing device of claim 15, wherein the instructions further cause the processing device to send the first version of the message to an additional automated translator with the request to translate the first version of the message to the first language after sending the first version of the message to the automated translator with the request to translate the first version of the message to the first language.

19. The computing device of claim 15, wherein identifying the message identifier comprises proactively selecting the message identifier while the application is running.

\* \* \* \* \*